(12) United States Patent
Freudenberger et al.

(10) Patent No.: US 12,483,405 B2
(45) Date of Patent: Nov. 25, 2025

(54) METHOD AND SYSTEM FOR ERROR CORRECTION CODING BASED ON GENERALIZED CONCATENATED CODES WITH RESTRICTED ERROR VALUES FOR CODE-BASED CRYPTOGRAPHY

(71) Applicant: HYPERSTONE GMBH, Constance (DE)

(72) Inventors: Juergen Freudenberger, Radolfzell (DE); Johann-Philipp Thiers, Constance (DE); Jens Spinner, Constance (DE)

(73) Assignee: HYPERSTONE GmbH (DE)

( * ) Notice: Subject to any disclaimer, the term of this patent is extended or adjusted under 35 U.S.C. 154(b) by 79 days.

(21) Appl. No.: 17/975,360

(22) Filed: Oct. 27, 2022

(65) Prior Publication Data

US 2023/0171102 A1 Jun. 1, 2023

(30) Foreign Application Priority Data

Oct. 27, 2021 (DE) .......................... 102021128031.1

(51) Int. Cl.
*H04L 9/30* (2006.01)
(52) U.S. Cl.
CPC .................................... *H04L 9/304* (2013.01)
(58) Field of Classification Search
CPC ......... H04L 9/304; H04L 9/3247–3257; H04L 63/0428–0457; H04L 2209/34
See application file for complete search history.

(56) References Cited

PUBLICATIONS

Puchinger et al. "Code-Based Cryptosystems Using Generalized Concatenated Codes", https://arxiv.org/abs/1511.08413; Published : Nov. 26, 2015 (Year: 2015).*

(Continued)

*Primary Examiner* — Kevin Bechtel
(74) *Attorney, Agent, or Firm* — Jaffery Watson Hamilton & DeSanctis LLP

(57) ABSTRACT

The present disclosure relates to error correction coding based on generalized concatenated codes with restricted error values for code-based cryptography. The error correction encoding comprises encoding the information according to a McEliece cryptosystem or according to a Niederreiter cryptosystem, in each case using an error vector containing at most $t \in \mathbb{N}$ non-zero error values; and a combination of: a permutation operation, a scrambling operation; and a coding operation involving a p-ary generalized concatenated code, GCC, having an error correction capability t up to which it can correct all possible error patterns. The GCC comprises multiple outer codes $A(1)$ with different dimensions $n1$ and $1=0, \ldots, N$, and an inner code B, the inner code B being one of an error correction code over Gaussian integers, an error correction code over Eisenstein integers, or a binary BCH error correction code, wherein q is a natural number with $q>2$ in the case of an error correction code over Gaussian integers or Eisenstein integers and with $q=2$ in the case of a binary BCH error correction code. A corresponding decoding method comprises applying erase decoding such that all decoding errors, if any, are recognized during the decoding of the GCC.

21 Claims, 7 Drawing Sheets

(56) References Cited

PUBLICATIONS

Klaus Huber. "Codes Over Gaussian Integers", IEEE Transactions On Information Theory, vol. 40, No. 1, Jan. 1994, https://ieeexplore.ieee.org/stamp/stamp.jsp?arnumber=272484 (Year: 1994).*
G. Alagic et al., "Status report on the second round of the NIST post-quantum cryptography standardization process," National Institute of Standards and Technology, NISTIR 83.
E. Berlekamp et. al. "On the inherent intractability of certain coding problems", IEEE Transactions on Information Theory, vol. 24, No. 3, pp. 384-386, 1978.
R. McEliece, "A public-key cryptosystem based on algebraic coding theory", DSN Progress Report, vol. 42-44, pp. 114-116, 1978.
H. Niederreiter, "Knapsack-type cryptosystems and algebraic coding theory", Probl. Control Inf. Theory, vol. 15, pp. 159-166, 1986.
E. Prange, "The use of information sets in decoding cyclic codes", IRE Transactions on Information Theory, vol. 8, No. 5, pp. 5-9, Sep. 1962.
A. May et al., "Decoding random linear codes inO(20.054n)" in Advances in Cryptology—Asiacrypt 2011, D. H. Lee and X. Wang, Eds. Berlin, Heidelberg: Springer Berlin Heid.
J. Freudenberger and J.-P. Thiers, "A new class of q-ary codes for the McEliece cryptosys-tem", Cryptography, vol. 11, No. 5, 2021.
N. Sendrier, On the Structure of Randomly Permuted Concatenated Code. [Research Report] RR-2460, INRIA. 1995. inria-00074216.
V. M. Sidelnikov et al., "On insecurity of cryptosystems based on generalized Reed-Solomon codes", Discrete Mathematics and Applications, vol. 2, No. 4, pp. 439-444, 1992.
S. Puchinge et al. "Code-based cryptosystems using generalized concatenated codes" in Applications of Computer Algebra, I. S. Kotsireas and EMart'nez-Moro, 2017, pp. 397-423.
Stern "A Method for Finding Codewords of Small Weight" Departement de mathmatiques et informatique Ecole Normale Suprieure Aug. 31, 1989.
K. Huber, "Codes over Gaussian integers", IEEE Trans. on Info. Theory, pp. 207-216, 1994.
"Codes over Eisenstein-Jacobi integers" Contemporary Mathematics, pp. 165-179, Jan. 1994.

* cited by examiner

Table 1

| codes over $\mathcal{E}_p$ | | | | | MDS codes | | | | |
|---|---|---|---|---|---|---|---|---|---|
| $p$ | $n$ | $k$ | $t$ | $N_{ISD}$ | $p$ | $n$ | $k$ | $t$ | $N_{ISD}$ |
| 139 | 276 | 55 | 167 | $2^{89}$ | 277 | 276 | 55 | 111 | $2^{47}$ |
| 157 | 312 | 63 | 187 | $2^{101}$ | 313 | 312 | 63 | 124 | $2^{53}$ |
| 193 | 384 | 77 | 231 | $2^{124}$ | 389 | 384 | 77 | 153 | $2^{65}$ |

Fig. 3

Table 2

| $p$ | $n$ | $k$ | $t$ | message-length [bytes] | |
|---|---|---|---|---|---|
| | | | | $\mathcal{G}_p$ | $\mathcal{E}_p$ |
| 137 | 272 | 55 | 163 | 73 | - |
| 139 | 276 | 55 | 167 | - | 86 |
| 157 | 312 | 63 | 187 | 84 | 97 |
| 193 | 384 | 77 | 231 | 103 | 120 |

Fig. 4

Table 3

| $p$ | $\pi$ | G | $d$ | $d^{(1)}$ |
|---|---|---|---|---|
| 109 | $10 + 3i$ | $\begin{pmatrix} 1 & -1-3i & 3+4i \\ 0 & 1 & 4-3i \end{pmatrix}$ | 5 | 11 |
| 157 | $11 + 6i$ | $\begin{pmatrix} 1 & -2-2i & 4-3i \\ 0 & 1 & 2+5i \end{pmatrix}$ | 5 | 12 |
| 197 | $14 + i$ | $\begin{pmatrix} 1 & -4+3i & -1-5i \\ 0 & 1 & 6-i \end{pmatrix}$ | 5 | 13 |

Fig. 6

Table 4

| reference | $p$ | $n$ | $R$ | $t$ | $N_{ISD}$ |
|---|---|---|---|---|---|
| proposed | 157 | 312 | 0.34 | 207 | $2^{283}$ |
| proposed | 157 | 312 | 0.45 | 127 | $2^{182}$ |
| proposed | 157 | 312 | 0.55 | 95 | $2^{104}$ |
| MDS | 313 | 312 | 0.34 | 103 | $2^{79}$ |
| MDS | 313 | 312 | 0.45 | 86 | $2^{92}$ |
| MDS | 313 | 312 | 0.55 | 75 | $2^{100}$ |

Table 5

| reference | $p$ | $n$ | $R$ | $t$ | $N_{ISD}$ |
|---|---|---|---|---|---|
| proposed | 109 | 270 | 0.5 | 91 | $2^{125}$ |
| proposed | 157 | 312 | 0.5 | 105 | $2^{144}$ |
| proposed | 197 | 384 | 0.5 | 129 | $2^{177}$ |
| [7] | 137 | 272 | 0.2 | 163 | $2^{88}$ |
| [7] | 157 | 312 | 0.2 | 187 | $2^{101}$ |
| [7] | 193 | 384 | 0.2 | 231 | $2^{124}$ |

Table 6

| $p$ | $\pi$ | $G$ | $d$ | $d^{(1)}$ |
|---|---|---|---|---|
| 223 | $11 + 17\omega$ | $\begin{pmatrix} 1 & 1 & 1 - 7\omega \\ 0 & 1 & -4 - 7\omega \end{pmatrix}$ | 5 | 8 |
| 229 | $12 + 17\omega$ | $\begin{pmatrix} 1 & 2 - 4\omega & -2 - 5\omega \\ 0 & 1 & -6 + 2\omega \end{pmatrix}$ | 5 | 10 |
| 271 | $10 + 19\omega$ | $\begin{pmatrix} 1 & -4 + 5\omega & -6 \\ 0 & 1 & -3 + 2\omega \end{pmatrix}$ | 5 | 11 |
| 277 | $12 + 19\omega$ | $\begin{pmatrix} 1 & -2 + 4\omega & -2 - 6\omega \\ 0 & 1 & -6 + \omega \end{pmatrix}$ | 5 | 10 |

Fig. 13

Table 7

| | field | inner codes | | | subcode | | exemplary GC code | | | | | |
|---|---|---|---|---|---|---|---|---|---|---|---|---|
| | | $n_i$ | $k_i$ | $d_i$ | $k_i^{(1)}$ | $d_i^{(1)}$ | $n$ | $R$ | $t$ | $N_{ISD}$ | key size | $d_B^\perp$ |
| 1 | $GF(2^{10})$ | 30 | 20 | 5 | 10 | 11 | 282 | 0.34 | 187 | $2^{255}$ | 262 kbit | 11 |
| 2 | $\mathcal{G}_{157}$ | 3 | 2 | 5 | 1 | 12 | 312 | 0.34 | 207 | $2^{283}$ | 261 kbit | 3 |
| 3 | $GF(2^{10})$ | 30 | 20 | 5 | 10 | 11 | 312 | 0.34 | 207 | $2^{283}$ | 320 kbit | 11 |

Fig. 14

Table 8

| codes over $GF(2^m)$ | | | | | MDS codes | | | | |
|---|---|---|---|---|---|---|---|---|---|
| $n$ | $k$ | $t$ | $N_{ISD}$ | key size | $n$ | $k$ | $t$ | $N_{ISD}$ | key size |
| 240 | 81 | 159 | $2^{217}$ | 190 kbit | 240 | 82 | 79 | $2^{61}$ | 154 kbit |
| 282 | 96 | 185 | $2^{250}$ | 265 kbit | 282 | 96 | 93 | $2^{72}$ | 234 kbit |
| 312 | 106 | 205 | $2^{277}$ | 323 kbit | 312 | 106 | 103 | $2^{79}$ | 291 kbit |

Fig. 15

METHOD AND SYSTEM FOR ERROR CORRECTION CODING BASED ON GENERALIZED CONCATENATED CODES WITH RESTRICTED ERROR VALUES FOR CODE-BASED CRYPTOGRAPHY

BACKGROUND

Field

Embodiments generally relate to the field of error correction coding (ECC), particularly to error correction coding based on generalized concatenated codes (GCC) with restricted error values for code-based cryptography.

Description of the Related Art

There exists a need in the art for advanced systems and methods for error correction coding.

SUMMARY

Various embodiments provide systems and methods for error correction coding based on GCC with restricted error values for code-based cryptography.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 3 provides a table (Table 1) showing exemplary parameters of codes with inner codes over Eisenstein integers with work factors between 289 and 2124, in comparison to MDS codes;

FIG. 4 provides a further table (Table 2) showing an exemplary comparison of Eisenstein integers with Gaussian integers;

FIG. 6 a further table (Table 3) showing examples of definitions of inner codes over Gaussian integers;

FIG. 13 a further table (Table 6) showing examples for inner codes over Eisenstein integer fields;

FIG. 14 a further table (Table 7) showing examples for inner codes; and

FIG. 15 a further table (Table 8) showing an exemplary comparison of proposed GC codes with MDS codes . . .

DETAILED DESCRIPTION

Figure 1:
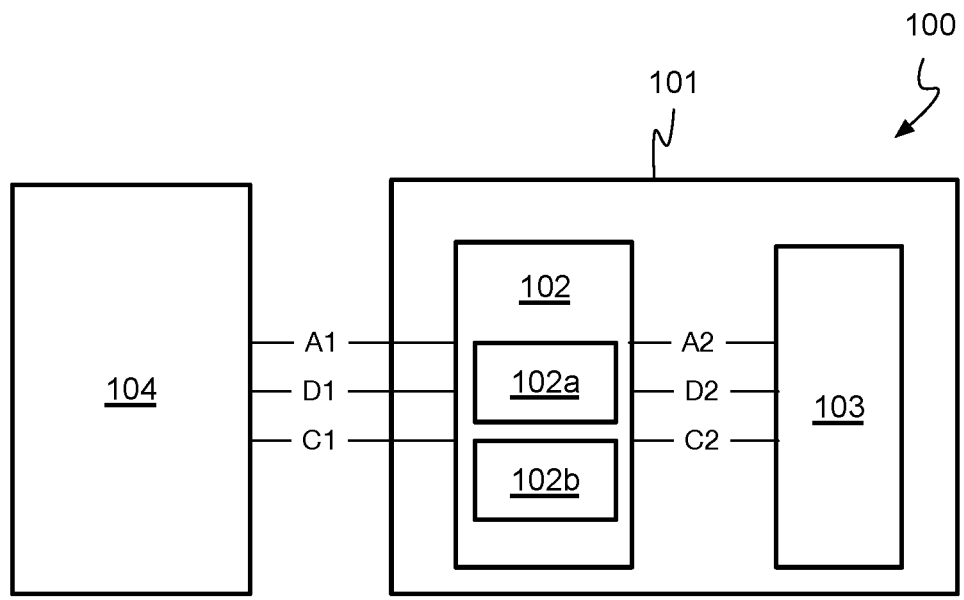
FIG. 1 schematically illustrates an exemplary embodiment of a computer system comprising a memory system with a memory controller serving as a coding system and a memory device.

Various embodiments provide systems and methods for error correction coding based on GCC with restricted error values for code-based cryptography.

In the following, numbers in brackets (such as [3] or [4,5] etc.) refer to certain references listed below in the section entitled "references", as identified in the list of references provided at the end of the description. Each of the references listed from is incorporated herein by reference for all purposes.

Non-volatile flash memories (NVM) are often applied for storage systems that require high data reliability, e.g., in industrial robots, scientific and medical instruments. A very common type of NVM are so-called flash memories. They are resistant to mechanical shock and provide fast read access times. Error correction coding is required to ensure reliability and data integrity of the data.

Public-key cryptographic algorithms are important for today's cyber security. They are used for key exchange protocols or digital signatures, e.g., in communication standards like Transport Layer Security (TLS), S/MIME, and PGP. Public-key encryption is based on a trapdoor-function which also defines the systems security.

The most common public-key cryptosystems nowadays are the Rivest-Shamir-Adleman algorithm (RSA) and the elliptic curve cryptography. Those are based on the intractability of integer factorization and the elliptic curve discrete logarithm problem, respectively. Both problems can be solved using quantum algorithms. Particularly, quantum algorithms already exist for both methods that are capable of breaking the ciphers in polynomial time. Hence, large scale quantum computers threaten the security of today's RSA and elliptic curve cryptosystems. To cope with this issue, several approaches have been proposed for cryptographic systems that are also secure against attacks by quantum computers.

One of these so-called "post-quantum" secure approaches is code-based cryptography [1]. Code-based cryptography is based on the problem of decoding random linear codes which is known to be NP-complete [1] and no quantum algorithms are known so far that can solve the decoding problem in polynomial time.

Various error correction codes have been proposed for code-based cryptographic systems, such as generalized Reed-Solomon codes, Polar codes, and QC-LDPC codes. A common attack on these schemes is Information Set Decoding (ISD). This attack relies on an algorithm to decode any linear code but requires exponential time. Some previously proposed code families showed vulnerability to structural attacks against the cryptographic system.

The best-known code-based cryptosystems are the McEliece system [3] and the Niederreiter system [4].

The basic idea of the McEliece system is that a message is encrypted by encoding it with a ciphered generator matrix and then intentionally inserting errors. The legitimate recipient must correct these errors, which is relatively easy to do with known codes. An illegitimate recipient, however, does not know the structure of the actual code since the public key contains only a ciphered generator matrix. Thus, the latter would have to decode a seemingly random, linear code. More specifically, in the McEliece system, the public key is a permuted and scrambled version of the generator matrix of an error correcting code. The message is encrypted by encoding the information with the scrambled generator matrix and adding intentional errors. The private key is the original generator matrix and the matrices used for scrambling and permutation. Using the private key, the received vector can be decoded into the original message. Due to the scrambling of the generator matrix, it is not possible to obtain its structure without the knowledge of the private key. Hence, an attacker needs to decode the received vector for a random-looking linear code.

The Niederreiter system is comparable to the McEliece system. However, secure digital signature schemes are only known for the Niederreiter system. Instead of the generator matrix the scrambled parity check matrix is used as public key. For encryption the message is encoded as an error vector and the cypher text is the syndrome calculated with the public parity check matrix. The private key again consists of the original parity check matrix as well as the matrices used for scrambling. For decryption a syndrome decoding algorithm is required, which recovers the error vector from the syndrome. As for the McEliece scheme, the most relevant attacks are based on ISD.

Code-based cryptographic systems are still rarely found in use today, mainly due to very large public keys. The actual size of the key depends on the code parameters of the error correction code used. However, very long codes are usually needed to achieve sufficient security. This is due to the fact that the complexity of decoding random codes increases with the number of errors. The sender can only insert as many errors as the legitimate receiver can correct.

If in the context of ECC a memory, such as a non-volatile memory (NVM), is used as a channel or a part thereof, code-based cryptographic systems may be used to encode the data to be stored in the memory. It may then at a later point in time be retrieved from the memory and decoded. Instead, or cumulatively, the channel may, for example, be used for the purpose of exchanging keys or cryptographic signatures In some embodiments, an improved code-based cryptographic system with high error correction capabilities and high code rates is provided. In some cases, such systems reduce the size of the public keys in code-based cryptographic systems, particularly of the McEliece type or the Niederreiter type.

A solution to this problem is provided by the teaching of the independent claims. Various preferred embodiments of the present solution are provided by the teachings of the dependent claims and/or of the description.

A first aspect of the present solution is directed to an encoding method, specifically to an encoding method for error correction encoding of information to be carried by a channel, particularly of data to be stored in a memory device. The encoding method comprises: providing a coding system and using the coding system to subject the information to error correction encoding to obtain encoded information.

Therein, the error correction encoding comprises: (i) encoding the information (i-1) according to a McEliece cryptosystem or (i-1) according to a Niederreiter cryptosystem, in each case using an error vector containing at most t $\in \mathbb{N}$ non-zero error values; and (ii) a combination of: (ii-1) a permutation operation, (ii-2) a scrambling operation; and (ii-3) a coding operation involving a p-ary generalized concatenated code, GCC. The GCC has an error correction capability t up to which it can correct all possible error patterns and the GCC comprises: multiple outer codes A(1) with different dimensions n1 and 1=0, . . . ,N, and an inner code B, the inner code B being one of an error correction code over Gaussian integers, an error correction code over Eisenstein integers, or a q-ary BCH error correction code. Therein, $p \in \mathbb{N}$ with p>2 in the case of the error correction codes over Gaussian integers or Eisenstein integers and with $q=p^m$, with m>0 being an integer, in the case of the q-ary BCH error correction code.

The alphabet used for generating the error vector in the McEliece cryptosystem or the Niederreiter cryptosystem, respectively, is selected such that each element of the alphabet is selected from a predetermined true subset of the alphabet over which the p-ary GCC is defined.

The terms "McEliece (crypto) system", "Niederreiter (crypto) system", "Gaussian integers" and "Eisenstein integers", and "BCH codes" and "generalized concatenated code", GCC as used herein, are known terms in the field of cryptography and mathematics and more detailed explanations thereof will be provided further below in the detailed description.

The term "encoding system", as used herein, refers to an apparatus or system (which particularly be located in a single location or distributed across different locations, such as a distributed computing system), which is configured to subject information to error correction encoding to obtain encoded information.

The term "channel", as used herein, may particularly refer to a communication channel. A channel may particularly refer to a physical transmission medium such as a wire, or to a logical connection over a multiplexed medium such as a radio channel in telecommunications and computer networking. A channel is used for information transfer of, for example a digital bit stream, from one or several senders to one or several receivers. A channel may thus have a certain capacity for transmitting information, often measured by its bandwidth in Hz or its data rate in bits per second. A particular form of a channel is a memory for storing information, wherein writing (storing) information into the memory corresponds to sending information over the channel and reading the previously stored information from the memory corresponds to receiving information from the channel.

Herein, as is common in telecommunication, information theory, and coding theory, the term "error correction coding" (ECC, frequently also referred to as forward error correction (FEC) or channel coding), refers to a technique used for controlling errors in data transmission over unreliable or noisy communication channels. The central idea is that the sender encodes the message in a redundant way, most often by using an ECC. The redundancy allows the receiver to detect a limited number of errors that may occur anywhere in the message, and often to correct these errors without re-transmission.

The terms "first", "second", "third" and the like in the description and in the claims, are used for distinguishing between similar elements and not necessarily for describing a sequential or chronological order. It is to be understood that the terms so used are interchangeable under appropriate circumstances and that the embodiments of the present solution described herein are capable of operation in other sequences than described or illustrated herein.

Unless the context requires otherwise, where the term "comprising" or "including" or a variation thereof, such as "comprises" or "comprise" or "include", is used in the present description and claims, it does not exclude other elements or steps and are to be construed in an open, inclusive sense, that is, as "including but not limited to".

Where an indefinite or definite article is used when referring to a singular noun e.g. "a" or "an", "the", this includes a plural of that noun unless something else is specifically stated.

Appearances of the phrases "in some embodiments", "in one embodiment" or "in an embodiment", if any, in the description are not necessarily all referring to the same embodiment. Furthermore, the particular features, structures, or characteristics may be combined in any suitable manner in one or more embodiments.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The encoding method of the first aspect involves a new code construction based on generalized concatenated codes (GCC) which in the current context are typically more robust against structural attacks than ordinary concatenated codes. Specifically, the proposed GCC construction involves an inner code B being one of an error correction code over Gaussian integers, an error correction code over Eisenstein integers, or a binary BCH error correction code. These codes can particularly achieve high code rates and higher error correction capabilities, particularly higher than those of the product codes from [7].

Furthermore, particularly in the case of an inner binary BCH code, the achievable security against the ISD attack (described in more detail below) as well as against the structural attack from [8] can be increased. That is, because for binary BCH codes, only one bit error is inserted into m bits. The total code may then be considered as a code over an alphabet with 2m values. Using an inner binary BCH code in the context of the encoding method provides that only m different error values can occur, while without such a restriction to one bit error per m bits, there are 2m−1 possible error values. Accordingly, compared to a Maximum Distance Separable Code (MDS code), the number of correctable errors can be doubled by applying the constraint.

While in the case of Gaussian integers, the related "one-Mannheim error" channel has four different error values, a similar channel model for Eisenstein integers has six different error values. In the Niederreiter cryptosystem, the message is encoded as an error vector. Hence, the representation with Eisenstein integers allows for longer messages compared with codes over Gaussian integers. The Niederreiter system is particularly also very suitable, for example, for creating digital signatures.

In the following, preferred embodiments of the encoding method of the first aspect are described, which can be arbitrarily combined with each other or with other aspects of the present solution, unless such combination is explicitly excluded or technically impossible.

In some embodiments, the alphabet used for generating the errors using the McEliece cryptosystem the alphabet used for generating the errors is selected such that each element of the alphabet has: in the case of the Gaussian integers, a Mannheim weight of 1; in the case of the Eisenstein integers, a hexagonal weight of 1; and in the case of inner BCH codes, a Lee-weight of 1 per m symbols. This choice may be particularly advantageous in view of the capability of correcting a comparably large number of errors.

In some embodiments, where the inner code B is one of an error correction code over Gaussian integers or an error correction code over Eisenstein integers and is chosen to be a one-error-correcting code (OEC code). The dimension of an OEC code is k=n−1 and the minimum Hamming distance is dH=2. The minimum hexagonal distance is dHX=3 for OEC codes over Eisenstein integers and the minimum Mannheim distance is dM=3 for OEC codes over Gaussian integers. Hence, such codes can detect any single error of arbitrary weight and correct a single error of weight one.

For the concatenated code construction, a special definition of OEC codes of length n=2 and minimum hexagonal or Mannheim distance d=4 may be selected. These codes are generated by a field element a of weight at least three. The parity check matrix is H=(1, a) and the generator matrix is G=(−a, 1). Depending on the choice of a this can result in a code of minimum distance d≥4. Hence, such a code can correct any single error of weight one and detect any error vector of weight two.

In some embodiments, the code C (n, k, t) is chosen such that is has a code rate R=k/n with R≤5/9. This may particularly be used to achieve code rates above those of comparable MDS codes.

In some embodiments, at least one, particularly each, of the outer codes of the GCC is chosen to be a Reed-Solomon, RS, code. This choice enables, particularly, erasure decoding for the outer codes, such that all decoding errors, if any, can be recognized during the decoding of the GCC.

A second aspect of the present solution is directed to a decoding method for error correction decoding, the decoding method being configured to decode information having been encoded with a GCC according to the encoding method of the first aspect, wherein erasure decoding is applied for the outer codes of the GCC such that all decoding errors, if any, are recognized during the decoding of the GCC.

In some embodiments, the decoding method comprises:
Partitioning the inner code B of the GCC into m+1 multiple sub-codes B(i) with i=0, . . . , m, with m>0 being a predetermined integer and with B(0)=B:
  Decoding the first-level inner code B(0) to retrieve codewords bj, with j=0, . . . , n0, of the inner code B or erasures;
  Determining the code symbols aj(0) of the first-level outer code A(0) among the multiple outer codes of the GCC for all known codewords bj by re-encoding the inner codewords bj(1) and bj(0);
  Decoding the first-level outer code A(0) to determine the positions of erased symbols, particularly all erased symbols, among the code symbols aj(0), if any;
  Encoding the symbols aj(0) to the codewords bj(0) for the positions of the determined erased symbols, if any;
  Determining the inner codewords bj(1)=bj−bj(0)∈B(1), where B(1) is a first-level sub-code B(1) of the inner code B.
  Decoding the inner sub-codes B(1) for all determined positions of erased symbols.

These embodiments of the decoding method define a particularly efficient exemplary way of implementing the decoding method. Specifically, m may, for example, be selected as m=1, which is a good choice particularly for the cases of Gaussian integers and Eisenstein integers. In the case of inner BCH codes m may, for example, be selected as $m=\in\{1;\ldots;4\}$.

In some of these embodiments, step b) comprises: Detecting all error patterns occurring in the first-level inner code B(0), if any; using a look-up table with precomputed syndromes for decoding all error patterns among the detected error patterns, which only have a single error; and for all error patterns among the detected error patterns, which have multiple errors, declaring an erasure and storing the identified locations of the errors as positions of erased symbols. Particularly by means of the look-up table, these specific embodiments define a very efficient exemplary way of implementing the decoding method.

In some embodiments, which may particularly be used if the outer codes are RS codes, the decoding method further comprises attempting a decoding of the encoded information, even when a determined number of errors in a determined error pattern exceeds an error correction capability t of the GCC up to which the GCC can correct all possible error patterns. While in this case, a successful error correction cannot be guaranteed for error patterns exceeding the error correction capability t, in many cases error correction will nevertheless be possible and decoding errors, if any, can always be recognized. Overall, this approach may lead to a higher average error correction level than t.

A third aspect of the present solution is directed to a coding system, such as a memory controller, e.g., implemented in a semiconductor device. The coding system is adapted to perform the encoding method of the first aspect and/or the decoding method of the second aspect, e.g., according to one more of their respective embodiments described herein.

Specifically, according to some embodiments, the coding system comprises (i) one or more processors, (ii) non-transitory computer-readable storage; and (iii) one or more programs being stored in the storage, which when executed on the one or more processors cause the coding system to perform the encoding method of the first aspect and/or the decoding method of the second aspect, e.g., according to one more of their respective embodiments described herein.

A fourth aspect of the present solution is directed to a computer program or computer program product, such as a non-transitory computer-readable storage medium, comprising instructions to cause a coding system, in particular the coding system of the third aspect, to perform the encoding method of the first aspect and/or the decoding method of the second aspect, e.g., according to one more of their respective embodiments described herein.

The computer program (product) may in particular be implemented in the form of a data carrier on which one or more programs for performing the method are stored. Preferably, this is a data carrier, such as a CD, a DVD, a hard disc or another non-volatile memory device, such as a flash memory device or module. In another implementation, the computer program product is provided as a file on a data processing unit, in particular on a server, and can be downloaded via a data connection, e.g. the Internet or a dedicated data connection, such as a proprietary or local area network.

The coding system of the third aspect may accordingly have a program memory in which the computer program is stored. Alternatively, the system may also be set up to access a computer program available externally, for example on one or more servers or other data processing units, via a communication link, in particular to exchange with it data used during the course of the execution of the computer program or representing outputs of the computer program.

The various embodiments and advantages outlined above for the encoding method and the decoding method, respectively, apply similarly for the coding system of the third aspect and the computer program (product) of the fourth aspect.

While process steps for an embodiment are exemplarily described for use in conjunction with the coding system of FIG. 1, one of ordinary skill in the art will understand that any coding system configured to perform the method steps of the encoding method and/or the decoding method, falls within the scope of the present solution.

For the sake of clarity, the following detailed description is structured into sections introduced in each case by a heading. These headings are, however, not to be understood as limiting the content of the respective section corresponding to a heading or of any figures described therein.

1. Example Coding System

For the sake of clarity, the following detailed description FIG. 1 shows an exemplary computer system 100 comprising a memory system 101 with a memory controller 102 and a memory device 103, which may particularly be a flash memory device, e.g., of the NAND type, and a host 104. The memory system 101 is connected to host 104, such as a computer to which the memory system 101, pertains, via a set of address lines A1, a set of data lines D1 and set of control lines C1. The memory controller 102 comprises a processing unit 102a and an internal memory 102b, typically of the embedded type, and is connected to the memory 103 via an address bus A2, a data bus D2, and a control bus C2. Accordingly, host 104 has indirect read and/or write access to the memory 103 via its connections A1, D1 and C1 to the memory controller 102, which in turn can directly access the memory 103 via the buses A2, D2 and C2. Each of the set of lines respectively buses A1, B1, C1, A2, B2 and C2 may be implemented by one or more individual communication lines.

The memory controller 102 is also configured as a coding system and thus adapted to perform the encoding and decoding methods of the present solution, particularly as described below with reference to FIGS. 2 to 14. To that purpose, the memory controller 102 may comprise a computer program residing in its internal memory 102b which is configured to perform one or more of these coding methods when executed on the processing unit 102a of the memory controller 102. Alternatively, the program may for example reside, in whole or in part, in memory 103 or in an additional program memory (not shown) or may even be implemented by a hard-wired circuit.

2. Code Based Crypto Systems

This section reviews the basics of the McEliece and Niederreiter systems as well as of information-set decoding.

2.1 The McEliece System

The McEliece cryptosystem published in [3] is a public-key cryptosystem which utilizes the problem of decoding random linear codes as trapdoor function. In the following the basic concept of the McEliece system will be shortly explained.

Consider a p-ary code C (n, k, t) of length n, dimension k, and the error correction capability t. The code can be represented by its generator matrix G and should enable an efficient decoding algorithm $\varphi(\cdot)$ for up to t errors. The public key is the pair (G', t). The matrix G' is a scrambled generator matrix G'=SGP, with the random non-singular k×k scrambling matrix S, and the n×n permutation matrix P. The private key consists of the three matrices (G, S, P).

For encrypting a message u of length k, the message is encoded using the public generator matrix G' and a random error vector e containing at most t non-zero error values is added, i.e., v=uG'+e. Using the private key, the message can be decryption by first computing r=vP$^{-1}$=uSG+eP$^{-1}$. Note that eP$^{-1}$ is a permuted error vector and the permutation does not change the number of errors. We decode r as φ(r)=φ(vP$^{-1}$)=uS. Finally, the message can be calculated using the inverse scrambling matrix.

2.2 The Niederreiter System

The Niederreiter system published in [4] is similar to the McEliece system, but is based on the parity check matrix. Consider a code C(n, k, t) with parity check matrix H and an efficient syndrome decoding algorithm φ(·). The public key is (H', t). The scrambled parity check matrix is calculated as H'=SHP, where S is a random non-singular (n−k)×(n−k) scrambling matrix and P is a random n×n permutation matrix. The private key consists of the three matrices (H, S, P). For encryption a message is first encoded as an error vector m of length n and at most t non-zero symbols. The cyphertext is the syndrome calculated using the public parity check matrix, i.e., s$^T$=H'm$^T$. The legitimate recipient receives s$^T$=H'm$^T$=SHPm$^T$ and computes S$^{-1}$s$^T$=HPm$^T$. He now applies the syndrome decoding algorithm φ(·) which produces the permuted error vector Pm$^T$ and then applies the inverse permutation which P$^{-1}$ to obtain the message m. As for the McEliece system, this decoding is only feasible with the knowledge of the scrambling and permutation matrices S and P.

2.3 Information-set Decoding

The best-known attacks on the McEliece system as well as the Niederreiter system are based on information-set decoding (ISD). Those attacks do not rely on any code structure except linearity, i.e., the attacks try to decode a random-looking linear code. Multiple such attacks were proposed as for example the attack in [6]. Here, only the basic concept of attacks based on ISD is reviewed.

For the McEliece system, the attacker tries to recover the information vector u'=uS from the cyphertext v=u'G'+e. To achieve this the attacker tries to guess k error free positions u" such that the corresponding columns of the public generator matrix G' form a non-singular matrix G". If such positions are found the attacker can use Gaussian elimination on the guessed positions of G' and re-encode a codeword v"=u"G" agreeing with v in the guessed positions. If v" differs in at most t positions from v there are no errors in u" and the attacker obtains u'=u"G"−1.

For the Niederreiter system, the attacker tries to find an error vector m of weight t such that H'm$^T$=s$^T$. To achieve this, an attacker tries random permutations P̃ on the public key H' and computes the systematic form as H"=UH'P̃= (A|I$_{n-k}$), where U is the matrix that produces the systematic form and I$_{n-k}$ is the (n−k)×(n−k) identity matrix. The attacker searches for a permutation such that the permuted message vector P̃m has all non-zeros in the rightmost n−k positions. Such a permutation can be detected by the Hamming weight of the scrambled syndrome Us$^T$=H"m$^T$. Due to the systematic form of H", the permuted message vector is P̃m= (0, . . . ,0| Us$^T$).

The complexity of information-set decoding attacks is determined by the expected number of trials required to find a permutation fulfilling those criteria. The probability for such a permutation is $$P_S = \frac{\binom{n-k}{t}}{\binom{n}{t}} \quad (1)$$

and the expected number of trials is $$N_{ISD} = \frac{1}{P_S} = \frac{\binom{n}{t}}{\binom{n-k}{t}}. \quad (2)$$

Herein, the term "$N_{ISD}$" is used to measure the work-factor for ISD attacks.

3. Codes Over Gaussian and Eisenstein Integers

Next, some properties of Gaussian and Eisenstein integers as well as some known code constructions for these number fields will be reviewed.

3.1 Gaussian integers

Gaussian integers are a subset of complex numbers with integers as real and imaginary parts, i.e., of the form a+bi, where a and b are integers. Herein, Gaussian integers will be denoted by the symbol $\mathcal{G}$. The modulo operation in the complex plane is defined as $$z \bmod \pi = z - \left\lceil \frac{z\pi^*}{\pi\pi^*} \right\rfloor \cdot \pi, \quad (3)$$

where [·] denotes rounding to the closest Gaussian integer, which is equivalent to rounding the real and imaginary parts individually. The set of Gaussian integers modulo π∈ $\mathcal{G}$ is denoted by $\mathcal{G}_p$. For π∈ $\mathcal{G}$ and p=ππ* such that p mod 4=1, the set $\mathcal{G}_p = \mathcal{G}$ mod π is a finite field. Furthermore, $\mathcal{G}_p$ is isomorph to the prime field $\mathbb{F}_p$ [11].

We measure the weight wt$_M$(z) of a Gaussian integer z as Mannheim weight, which is the sum of the absolute values of its real and imaginary parts, i.e., $$wt_M(z) = \min_{a+bi \in K(z)} |a| + |b| \quad (4)$$

Where K(z) is the set of Gaussian integers z' such that z= z' mod π. The Mannheim distance between two Gaussian integers is the weight of the difference $$d_m(z,y) = wt_M(z-y). \quad (5)$$

The Mannheim weight of a vector is the sum of Mannheim weights of all elements of the vector. The same holds for the Mannheim distance between two vectors.

3.2 The One-Mannheim Error Channel

The one-Mannheim error channel is a discrete memoryless channel, which restricts the error values to Mannheim weight one [7]. Given an error probability e each error symbol is zero with probability 1−∈ and one of {1, −1,i, −i} with probability ∈/4 each. Codes over Gaussian integers are typically able to correct a comparably large amount of errors if the Mannheim weight of the errors is restricted. Hence, this channel model is advantageous for the use with codes over Gaussian integers. Note, that the work factor for information set decoding (2) only depends on the number of errors but not on their weight. The capacity of the one-Mannheim error channel was considered in more detail in [7].

3.3 Eisenstein Integers

Eisenstein integers are a subset of complex numbers of the form x=a+bω, where a and b are ordinary integers. The base element @ is a root of unity, i.e., $$\omega = -\frac{1}{2} - \frac{\sqrt{3}}{2}i.$$

Eisenstein form a hexagonal structure in the complex plane and the set of Eisenstein integers is denoted as ε. As for Gaussian integers, a finite field can be defined as the set $\varepsilon_p = \varepsilon$ mod π, where π∈ ε and p=ππ*. In contrast to Gaussian integers, the prime p has to fulfill p mod≡6=1, due to the hexagonal structure. For such π the field $\varepsilon_p$ is isomorph to the prime field $\mathbb{F}_p$ [12].

The weight of an Eisenstein integer may be measured as hexagonal weight, which is defined by the minimum number of unit steps in directions which are a multiple of 60°. An Eisenstein integer z can be written as $z = g_1 \epsilon_1 + g_2 \epsilon_2$ with $\epsilon_1, \epsilon_2 \in \{\pm 1, \text{to}, \pm\omega, \pm(1+\omega)\}$. Note, that (1+ω) is a sixth root of unity and ω is a third root of unity. Hence, $\epsilon_1, \epsilon_2$ can each take the six powers of the sixth root of unity. The weight is defined as $$wt_{HX} = \min_{g_1, g_2: g_1 \epsilon_1 + g_2 \epsilon_2 = z} |g_1| + |g_2| \quad (6)$$

As for Gaussian integers, the weight of a vector is the sum of weights of the elements and the distance between two Eisenstein integers is the weight of the difference.

3.4 The Weight-One Error Channel

The concept of the one Mannheim error channel can be extended from Gaussian integers to Eisenstein integers. The weight-one error channel is a discrete memoryless channel, which restricts the error values to hexagonal weight one. Hence, only error values $e_i \in \{\pm 1, \pm\omega, \pm(1+\omega)\}$ are possible. Note that ω is a third root of unity and (1+ω) is a sixth root of unity. Hence, these six possible values form a hexagon in the complex plane.

Figure 2:
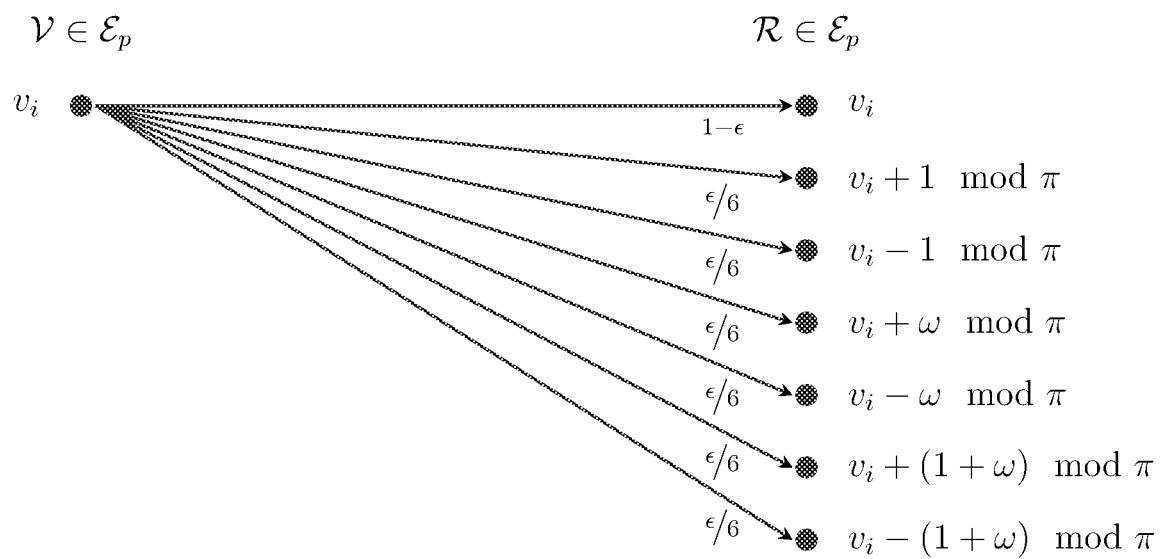
FIG. 2 illustrates an exemplary channel model of a weight-one error channel.

FIG. 2 illustrates the channel model of the weight-one error channel. For a given channel error probability E, error-free transmission ($e_i=0$) occurs with probability 1−∈, while each of the six errors has the same probability of ∈/6.

3.5 One-Error-Correcting (OEC) Codes

One error correcting codes over Gaussian as well as over Eisenstein integers fields were proposed in [11] and [12], respectively. The parity check matrix H is defined as $$H = (\alpha^0, \alpha^1, \alpha^2, \ldots, \alpha^{n-1}), \quad (7)$$

Where α is a primitive element of the field. A vector $v=(v_0, v_1, v_2, \ldots, v_{n-1})$ is a codeword if and only if $Hv^T=0$. For codes over Eisenstein integers, we have $v_i \in \varepsilon_p$ and the length of an OEC code satisfiesn $$\leq \frac{p-1}{6}.$$

For OEC codes over Gaussian integers, we haven $$\leq \frac{p-1}{4} \text{ and } v_i \in \mathcal{G}_P.$$

The dimension of an OEC code is k=n−1 and the minimum Hamming distance is $d_H=2$. The minimum hexagonal distance is $d^{HX}=3$ for OEC codes over Eisenstein integers and the minimum Mannheim distance is $d_M=3$ for OEC codes over Gaussian integers. Hence, such codes can detect any single error of arbitrary weight and correct a single error of weight one.

For the concatenated code construction, a special definition of OEC codes of length n=2 and minimum hexagonal or Mannheim distance d=4 is considered [7]. These codes are generated by a field element a of a weight of at least three. The parity check matrix is H=(1, α), and the generator matrix is G=(−α, 1). Depending on the choice of a this can result in a code of minimum distance d≥4. Hence, such a code can correct any single error of weight one and detect any error vector of weight two.

4. Product Codes Over Eisenstein Integers

In [7] a product code construction from outer Reed-Solomon (RS) codes and inner one-Mannheim error correcting (OMEC) codes was proposed. This construction achieved a higher error correction capability than MDS codes if the errors were introduced by the one-Mannheim error channel. This results in a higher work factor for information-set decoding due to the larger amount of intentional errors, which can be introduced. In this section, this code construction is adapted for codes over Eisenstein integers.

While the restriction for the primes is different for Gaussian and Eisenstein integers, choosing the same prime leads to the same code parameters and therefore the same work factor for information set decoding. Hence, for the McEliece system, it has no advantage to use Eisenstein integers. For the Niederreiter system, on the other hand, the message is encoded as an error vector. While for the one-Mannheim error channel model each error position can only take four different values, the weight-one error channel model allows for six different values. Hence, codes over Eisenstein integers obtain a larger message size compared with codes over Gaussian integers with similar length and dimension.

4.1 Code Construction

We consider product codes of outer RS codes $C_0(n_0, k_0, d_0)$ over GF(p) and inner OEC codes $C_i(n_i, k_i, d_i)$ over $\varepsilon_p$, where p=ππ*. Note that do denotes the minimum Hamming distance of the RS code, while $d_i$ denotes the minimum hexagonal distance of the OEC code. For encoding, first ki codewords of the outer RS code are encoded and stored in the first ki columns of an ($n_0 \times n_i$)-matrix. Now the symbols are mapped to elements of $\varepsilon_p$ and $n_0$ OEC codewords are encoded for each row of the matrix. This product code has length $n=n_0 \, n_i$, dimension $k=k_0 \, k_i$, and minimum hexagonal distance $d_{HX}=d_0 \, d_i=(n_0-k_{0+1}) \, d_i$, as shown in [7] for the comparable construction over Gaussian integer fields.

Herein, the special OEC codes of length two as described in section 3.5, is considered as inner codes, i.e., $C_i(2,1,4)$. The resulting product code has length $n=2n_0$, dimension $k=k_0$, and minimum hexagonal distance $d_{HX}=4d_0=4 (n_0-k_{0+1})$. Hence, it can correct $t=(d-2)/2=2 (n_0-k_0)+1=n-2k+1$ errors with and error and erasure decoding procedure described in [7]. However, this decoding procedure is only applicable for the McEliece system.

In the next section, a decoding method will be discussed, which is able to reconstruct the complete error vector from the syndrome, as required for the Niederreiter system.

4.2 Syndrome Decoding

For the syndrome decoding, herein the use of look-up tables is proposed for the inner OEC codes and erasure decoding for the outer RS codes. Now, a parity check matrix is considered of the form $$H = \begin{pmatrix} H_{RS} & 0 \\ I_{n_0} & a \cdot I_{n_0} \end{pmatrix} \quad (8)$$

Where $H_{RS}$ is the parity check matrix of the outer RS code and the lower part $(I_{n_0} \alpha \cdot I_{n_0})$ is the Kronecker-product of the parity check matrix of the OEC codes and an $(n_0 \times n_0)$ identity-matrix. With this definition, the first $n_0-k$ syndrome values correspond to the RS code and the last no syndrome values belong to the inner OEC codes. The public key is a scrambled version of the parity check matrix, i.e., H'=SHP, where S is a random invertible scrambling matrix and P is a permutation matrix.

To decode the scrambled syndrome $s^T=SHPm^T$, one first unscrambles the syndrome as $\tilde{s}^T=S^{-1}s^T=HPm^T$, and then decodes the inner OEC codes using a look-up in a precomputed syndrome table. Since the inner codewords have length two and the OEC codes have minimum hexagonal distance $d_i \geq 4$, any single error resulting from the weight-one error channel can be corrected, while any error vector of up to two errors can be detected. The precomputed syndrome table provides the error location and value for each correctable error pattern, i.e., each error pattern with only one error. For each error pattern with two errors an erasure is declared for use in the outer decoder. Since $\tilde{s}^T=HPe^T$, the inner decoder produces parts of the permuted error vector, which is denoted as $P\hat{e}^T$.

After the inner decoding, update the residual syndrome is updated for the use in the outer decoder. The residual syndrome is the syndrome corresponding to an error vector $e-\hat{e}$ of lower weight. The syndrome to the partial error vector $\hat{e}$ can be computed using the private matrices H and P. This syndrome can be subtracted from the received syndrome $$\tilde{s}_{res}^T = HP(e-\hat{e})^T = \tilde{s}^T - HP\hat{e}^T. \quad (9)$$

The outer RS code is now decoded using the residual syndrome $\tilde{s}_{res}$ as well as the erasure positions declared by the inner decoders. Since the inner decoders detected all error vectors, there are no unknown error positions and erasure-only decoding can be applied to the RS code. This is done using the Forney algorithm. Given the positions $j_i$, $i=1, \ldots, v$ corresponding to the v erasures, those can be used to calculate the error location polynomial as $$\Lambda(x) = \prod_{i=1}^{v} (1 - xX_i). \quad (10)$$

This polynomial has roots at $X_1^{-1}, \ldots, X_v^{-1}$ with $X_i = \alpha^{ji}$. We represent the residual syndrome as polynomial, i.e., $$s_{res}(x) = s_0 + s_1 x + \ldots + s_{n_0-k-1} x^{n_0-k-1}$$

and calculate the error-evaluator polynomial $\Omega(x)$ using the key equation $$\Omega(x) = S_{res}(x)\Lambda(x) \bmod x^{n_0-k} \quad (11)$$

The error values are determined as $$\hat{e}_i = -\frac{\Omega(X_i^{-1})}{\Lambda'(X_i^{-1})}, \quad (12)$$

where $\Lambda'(x)$ is the derivative of $\Lambda(x)$. If the number of erasures v does not exceed $n_0-k$, the RS decoder is able to find all error values in the information digits of the OEC codewords. Now the update step in (9) can be used again with an updated error vector $\hat{e}$ and the syndrome decoding of the OEC codewords can be repeated to find all remaining errors. The inner codewords have length two. Hence, after correcting one position using the outer code only a single weight-one error can remain, which is corrected using the syndrome tables.

Next, an estimation of the error correcting capability of this decoding procedure is discussed. A minimum of $2(n_0-k)$ channel errors is required to cause a decoding failure in the outer decoder, because no-k erasures can be corrected by the outer decoder and an erasure requires two errors in an inner codeword. Additionally, the OEC code corrects all single errors in the inner codewords.

Therefore, at least $t=2 (n_0-k)+1=n-2k+1$ errors can be corrected. Depending on the error positions this decoding procedure can correct some patterns with up to $2 (n_0-k)+k=n-k$ errors. In comparison with MDS codes, which have an error correction capability of $(n-k)/2$, the proposed construction is advantageous for code rates R<1/3.

4.3 Code Examples

Table 1 in FIG. 3 shows a comparison of the proposed code construction with MDS codes. The table provides the field size p, code length n, dimension k, error correction capability t, as well as the work factor for information set decoding $N_{ISD}$. The left-hand side of the table considers the proposed code construction, while the right-hand size illustrates comparable MDS codes.

In all examples the work factor for information-set decoding of the proposed construction is significantly higher than for MDS codes.

Table 2 in FIG. 4 shows a comparison of the proposed code construction over Eisenstein integers with the same construction over Gaussian integers from [7]. We compare the message lengths for a Niederreiter system. Note that the restriction of the field sizes is different. For p=137 one can construct only codes over Gaussian integers, whereas for p=139 one can construct only codes over Eisenstein integers. However, the codes are comparable. For p=157 and p=193, Eisenstein and Gaussian integer fields exist. The message size with Eisenstein integers is notably increased. This results from the different channel models. Eisenstein integers allow for six different error values instead of four with Gaussian integers. Due to the same code parameters, the work factor for information-set decoding is the same. Therefore, the codes over Eisenstein integers are only advantageous for Niederreiter systems.

4.4 Structural Attacks

While the product code construction proposed in [7] for Gaussian integers shows a significantly increased work factor for information-set decoding compared with MDS codes, the construction may not be secure against structural attacks. The attack proposed in [8] may allow to restore the concatenated structure of the code construction. Afterward, the attack proposed in [9] can produce the structure of the outer Reed-Solomon code.

In [10], it was shown that generalized concatenated codes can withstand the aforementioned structural attacks. Furthermore, those codes enable higher code rates. In the following, a generalized concatenated code construction, which has a higher work factor for information-set decoding than MDS codes as well as the proposed product codes will be discussed. Furthermore, this construction improves the robustness against structural attacks.

5. Generalized Concatenated Codes Over Gaussian and Eisenstein Integers

In this section, a generalized concatenated code (GCC) construction is proposed. First, codes over Gaussian integers are considered, which in combination with the one-Mannheim error channel is advantageous for the use in code-based cryptosystems. A decoding procedure for those codes is investigated. Finally, it is demonstrated that the GCC construction can be extended to codes over Eisenstein integers.

5.1 Code Construction

Generalized concatenated (GC) codes (GCC) are multilevel codes with one inner code $B(n_i, k_i, d_i)$ and multiple outer codes $A^{(1)}(n_0, k_0^{(1)}, d_0^{(1)})$ with different dimensions. The basic idea of GC codes is to partition the inner code into multiple levels of subcodes, which are then protected by different outer codes. For the sake of clarity and without limitation, in the following explanation, only GC codes with two outer codes $A^{(0)}$ and $A^{(1)}$ of same length no but different dimensions are considered. Again, a codeword is represented as a matrix, where each column is a codeword of the inner code B.

Figure 5:
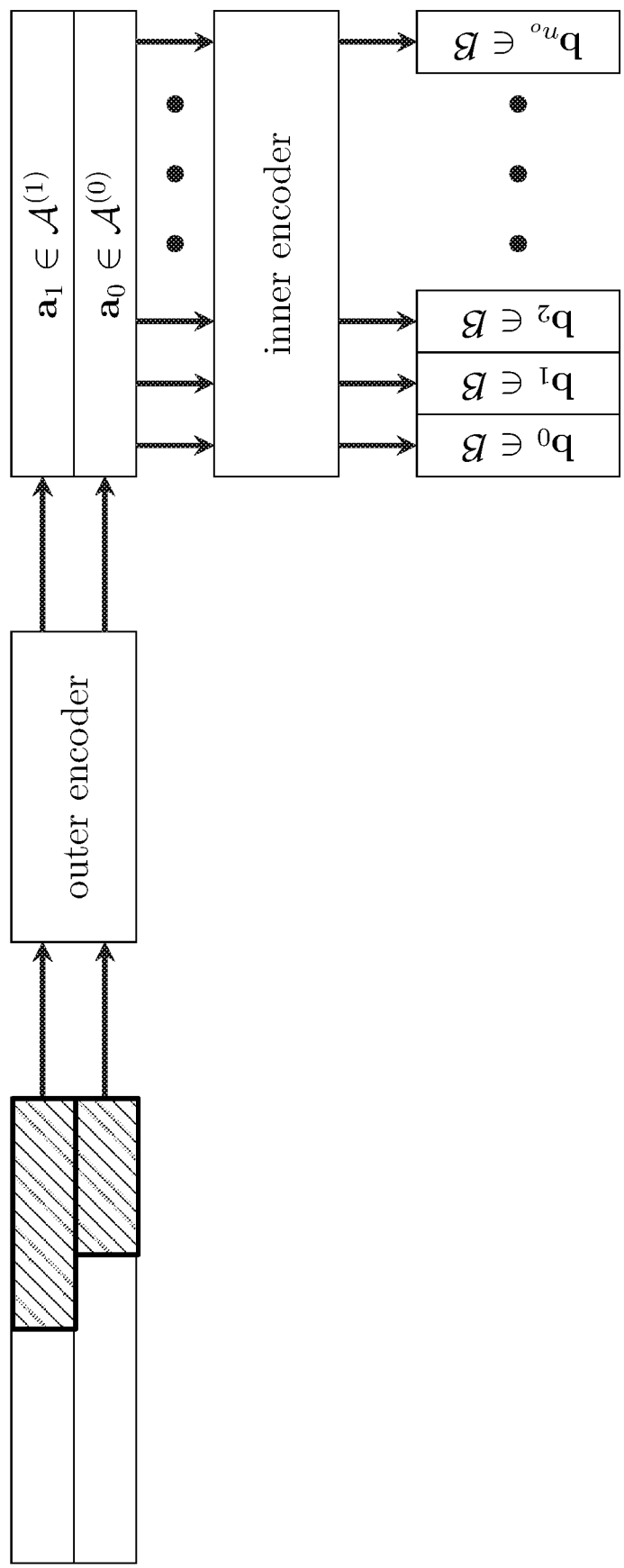
FIG. 5 an exemplary illustration of an embodiment of the encoding method.

FIG. 5 shows the encoding of GC codewords, where first the outer encoder encodes the two codewords $a_1 \in A^{(1)}$ and $a_0 \in A^{(0)}$. Then, each column is encoded by the inner encoder to a codeword bj $\in$ B. The length of the GC code is $n=n_0 n_i$, as can be seen from the construction. The dimension is the sum of the outer dimensions.

For the inner codes, now codes over Gaussian integers are considered, which achieve a high error correction capability over the one-Mannheim error channel and enable a partitioning into sub-codes with increased minimum distance.

FIG. 6 shows Table 3 with some examples for such inner codes with their field size p, their modulus π, their generator matrix, and the minimum Mannheim distance of the code and subcode. We consider inner codes of length $n_i=3$ and dimension $k_i=2$, i.e., $B(3, 2, d_i)$, where $d_i \geq 5$ is the minimum Mannheim distance. Those codes can correct up to two errors of Mannheim weight one. These codes need not be constructed from one-Mannheim error correcting codes but can be found by computed search. The generator matrix of the code B is chosen in the form $$G = \begin{pmatrix} 1 & a & b \\ 0 & 1 & c \end{pmatrix}. \tag{12}$$

Where a, b, and c are elements of $\mathcal{G}_p$. In that case, the first row is the generator matrix of a subcode $B^{(1)}(3,1,d^{(1)}) \subset B$ with higher minimum Mannheim distance $d^{(1)}$. Note that no codes with d≥5 were found for filed sizes p<109.

Since the subcodes in Table 3 can correct at least three errors of Mannheim weight one, the second level information digits need no further protection if the one-Mannheim error channel model is used. For the first level outer code $A^{(0)}$, a Reed-Solomon code of length no and dimension no is applied.

Figures 7, 9, 11:
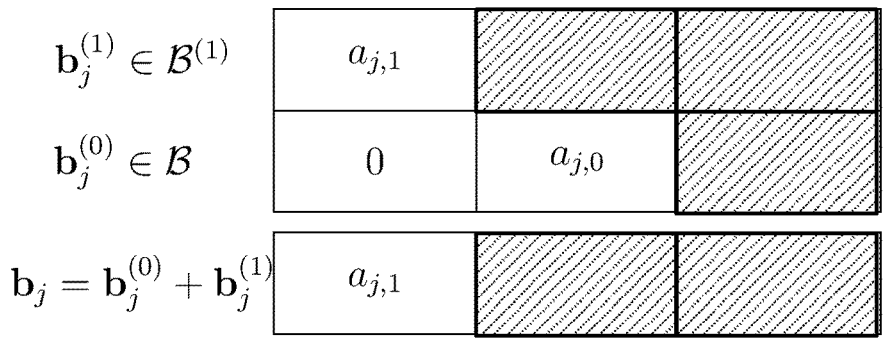
FIG. 7 an exemplary illustration of inner encoding of GC codes (GCC)
FIG. 9 a further table (Table 4) showing an exemplary comparison of proposed GC codes with MDS codes.
FIG. 11 a further table (Table 5) showing an exemplary comparison of proposed GC codes with product codes from reference [7]

The GC code has length $n=3 n_0$ and dimension $k=n_0+k_0$, because the second outer level is uncoded. FIG. 7 represents the encoding of a single column of the codeword. The outer code symbol $a_{j,0}$ is encoded with the second row of the generator matrix G of the inner code, which results in a codeword $b_j^{(0)} \in B$. The outer code symbol $a_{j,1}$ is encoded with the first row of G, which is the generator matrix of the subcode and results in $b_j^{(1)} \in B^{(1)}$. The codeword in the $j^{th}$ column is the sum of two codewords, i.e., $b_j = b^{(0)} + b^{(1)} \in B^{(1)}$. Note, that the upper part of FIG. 7 has the same form as the generator matrix (13), where the hatched blocks represent the parity symbols.

5.2 Decoding

Figure 8:
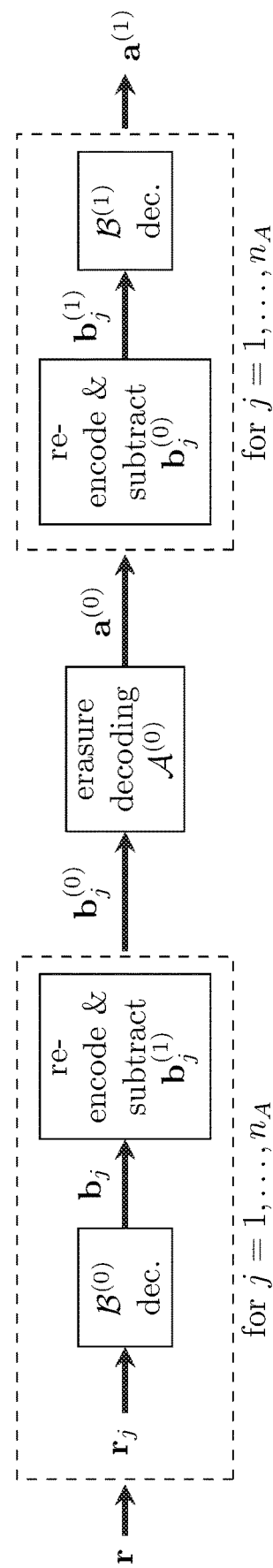
FIG. 8 an exemplary decoding process for decoding the GCC codes.

The decoding of the GC code is illustrated in FIG. 8. It consists of multiple steps.
1. Decode the inner codes $B^{(0)}$, which results in the codewords $b_j$ or erasures;
2. Determining the code symbols $a_j^{(0)}$ of the level 0 outer code for all known codewords $b_j$ by re-encoding the inner codewords $b_j^{(1)}$ and $b_j^{(0)}$;
3. Decoding $A^{(0)}$ which determines the erased symbols $a_j^{(0)}$;
4. Encoding the symbols $a_j^{(0)}$ to the codewords $b_j$ for the erasure positions
5. Determine the inner codewords $b_j^{(1)} = b_j - b_j^{(0)} \in B^{(1)}$ 6. Decode the inner codes $B^{(1)}$ for all erasure positions.

These steps are now considered in more detail. For decoding the GC code, first the inner Codes B(3,2,5) are decoded. While those codes can correct two errors of Mannheim weight one, now only one error is corrected and therefore any possible error pattern generated by the one-Mannheim error channel can be detected. A look-up table with precomputed syndromes is used for decoding all error patterns with a single error. In cases where more errors occur, an erasure is declared, and the error location is stored. Note that all error patterns are detected. Hence, an erasure-only decoding can be applied for the outer RS code.

Decoding the outer code $A^{(0)}$ requires the code symbols $a_{j,0}$ for all positions where no erasure was declared. Note that the inner codeword in the $j^{th}$ column is the sum of two codewords of the subcodes, i.e., $b_j = b_j^{(0)} + b_j^{(1)}$. The first digit of $b_j$ is the outer code symbol $a_{j,1}$ (cf. FIG. 7), as the second row of G has a zero in the first position. Hence, this symbol can be used to determine the codeword $b_j^{(1)}$ of the subcode $B^{(1)}$. Subtracting $b_j^{(1)}$ from $b_j$ results in $b_j^{(0)}$.

Now, the row consisting of the symbols $a_{j,0}$; $j=0, \ldots, n_0-1$, which was obtained by re-encoding, can be decoded. An erasure decoding is applied to the Reed-Solomon code, which is based on the Forney algorithm, as explained above for the outer RS code in Section 4.2. This method can correct up to $n_0$-$k_0$ erasures.

The outer decoding determines all symbols $a_{j,0}$ in the codeword of the outer code $A^{(0)}$. With these symbols, the inner codewords $b_j^{(0)}$ for all columns with erasures can be calculated. Furthermore, the inner codewords $b_j^{(1)} = b_j - b_j^{(0)} \in B^{(1)}$ can be determined in the subcode.

Finally, the resulting codewords in the subcode $B^{(1)}$, which has minimum distance $d^{(1)} \geq 7$ and can correct all remaining errors, can be decoded.

Proposition 1: The generalized concatenated code with outer Reed-Solomon code $A^{(0)}$ ($n_0$, $k_0$, $d_0$), and inner code $B(3,2,5)$ over $\mathcal{G}_p$ with subcode $B^{(1)}(3,1,d^{(1)})$ and $d^{(1)} \geq 7$ can correct $$t \geq 2(n_o - k_o) + 1 \tag{14}$$

errors of Mannheim weight one.

Proof. Let $b \in B(3,2,5)$ be a transmitted codeword of the inner code and e a length three error vector with up to three errors of Mannheim weight one. For any codeword $b' \in B(3,2,5)$, the Mannheim distance to the received sequence is lower-bounded by $$d_M(b', b+e) = wt_m(b'-b-e) \geq d - wt_M(e) \geq 2 \tag{15}$$

Hence, any error pattern of a Mannheim weight one can be corrected and any error pattern of Mannheim weight two or three can be detected. For error patterns of weight greater one an erasure is declared. The outer Reed-Solomon code can correct up to $n_0-k_0$ erasures and each erasure requires at least two errors. Hence, $2(n_0-k_0)$ errors can be corrected in the erasure positions and at least one additional error in any position.

This results in (14) for the first level. If the first level decoding is successful, the second level is decoded in the inner subcode $B^{(1)}(3,1, d(1))$ with $d(1) \geq 7$. Note that this subcode is able to correct any possible error pattern with up to three errors, thus no outer decoding is required in the second level. The decoding procedure only fails, if the first level fails, i.e., if more than n0–k0 erasures happen, which requires more than $2(n_0-k_0)+1$ errors.

Example 1: Let the inner code $B^{(0)}$ be the first code from Table 3 over the Gaussian integer field $\mathcal{G}_{109} = \mathcal{G}$ mod $10+3i$. Using the generator matrix given in the table, it can easily verified that $$H = (1 - 3 - 5i \; 2 - 3i) \tag{16}$$

is a parity check matrix for that code and $$H^{(1)} = \begin{pmatrix} 1+3i & 1 & 0 \\ -3-4i & 0 & 1 \end{pmatrix} \tag{17}$$

a parity check matrix for the subcode generated by the first row of G. For simplicity, now a repetition code $A^{(0)}(109; 2, 1, 2)$ over the field $\mathbb{F}_{109}$ is considered as outer code for level 0, whereas level 1 remains uncoded. The GC codeword can be represented as a 3×2 matrix with elements from $\mathcal{G}_{109}$, where each column is a codeword of the inner code.

Considering the received word $$r = \begin{pmatrix} -4-4i & -i \\ 2+5i & 2+i \\ 1+3i & 3i \end{pmatrix}, \tag{18}$$

where the two columns lead to the syndromes $-3-2i$ and $-5-i$, respectively. A precomputed syndrome table gives us the error vector $e_1 = (0, 0, -i)^T$ for the first column. The syndrome of the second column does not belong to any error pattern of Mannheim weight one and therefore an erasure is declared.

The error vector er is subtracted from the first column $r_1$ to get a codeword $b_1$ of the inner code.

$$b_1 = \begin{pmatrix} -4-4i \\ 2+5i \\ 1+3i \end{pmatrix} - \begin{pmatrix} 0 \\ 0 \\ -i \end{pmatrix} = \begin{pmatrix} -4-4i \\ 2+5i \\ 1+4i \end{pmatrix} \tag{19}$$

The first symbol is the first information symbol $u_1^{(1)} = -4-4i$ since the outer level 1 is uncoded (cf. FIG. 7). This symbol is used to re-encode the inner subcode codeword $b_j^{(1)}$ using the first row of the generator matrix. This codeword is then subtracted from $b_1$ to obtain $b_j^{(0)}$ and therefore the code symbol $a_1^{(0)}$ of the level 0 outer code.

$$b_1^{(0)} = \begin{pmatrix} -4-4i \\ 2+5i \\ 1+4i \end{pmatrix} - \begin{pmatrix} -4-4i \\ -2-4i \\ -5+2i \end{pmatrix} = \begin{pmatrix} 0 \\ -3-4i \\ -4-i \end{pmatrix} \tag{20}$$

There is one error free position of the outer level 0 code and this symbol is used to re-encode $a^{(0)}$. Since $A^{(0)}$ is a repetition code, $a^{(0)} = (-3-4i, -3-4i)$, where the information symbol $u^{(0)} = -3-4i$. Now, $a_2^{(0)}$ can be used to re-encode $b_2^{(0)}$ for the second column using the last row of the generator matrix. Subtracting $b_2^{(0)}$ from the received vector $r_2$ results in an erroneous codeword of the inner subcode.

$$r_2^{(1)} = \begin{pmatrix} -i \\ 2+i \\ 3i \end{pmatrix} - \begin{pmatrix} 0 \\ -3-4i \\ -4-i \end{pmatrix} = \begin{pmatrix} -i \\ -5+2i \\ 4+4i \end{pmatrix} \tag{21}$$

The syndrome is now calculated using $H^{(1)}$ to receive $s_2^{(1)} = (-2+i, 3-3i)$. According to a precomputed syndrome table, this belongs to the error vector $(i,1,-1)^T$, which we subtract from $r_2^{(1)}$.

$$b_2^{(1)} = \begin{pmatrix} -i \\ -5+2i \\ 4+4i \end{pmatrix} - \begin{pmatrix} i \\ 1 \\ -1 \end{pmatrix} = \begin{pmatrix} -2i \\ -6+2i \\ -5+i \end{pmatrix} \tag{22}$$

The first symbol in this vector is the code symbol $a_2^{(1)}$ of the outer level 1 codeword completing the information vector $u^{(1)} = (-4-4i, -2i)$. Note that the overall GC code has the length n=6 and the dimension k=3. It can correct all error patterns with up to t=n−k=3 errors, whereas the example demonstrates that the decoding algorithm can correct guaranteed error correction capability depending on the location of the errors.

The maximum number of errors, which can be corrected by this decoding procedure is 3 $(n_0-k_0)+k_0$. For this, it may be assumed, that each erasure results from three errors and each of the $k_0$ inner codewords which does not result in an erasure has exactly one error. On the other hand, this requires a very specific distribution of the errors.

5.3 GC Code Examples

The guaranteed error correction capability of the proposed code construction is $t=2 (n_0-k_0)+1$, which for code rates $R \leq 5/9$ is higher than the error correction capability $(n-k)/2$ of MDS codes. One can now compare the proposed code construction with the product code construction from [7] as well as MDS codes with respect to the work factor for information-set decoding based according to (2).

Figure 10:
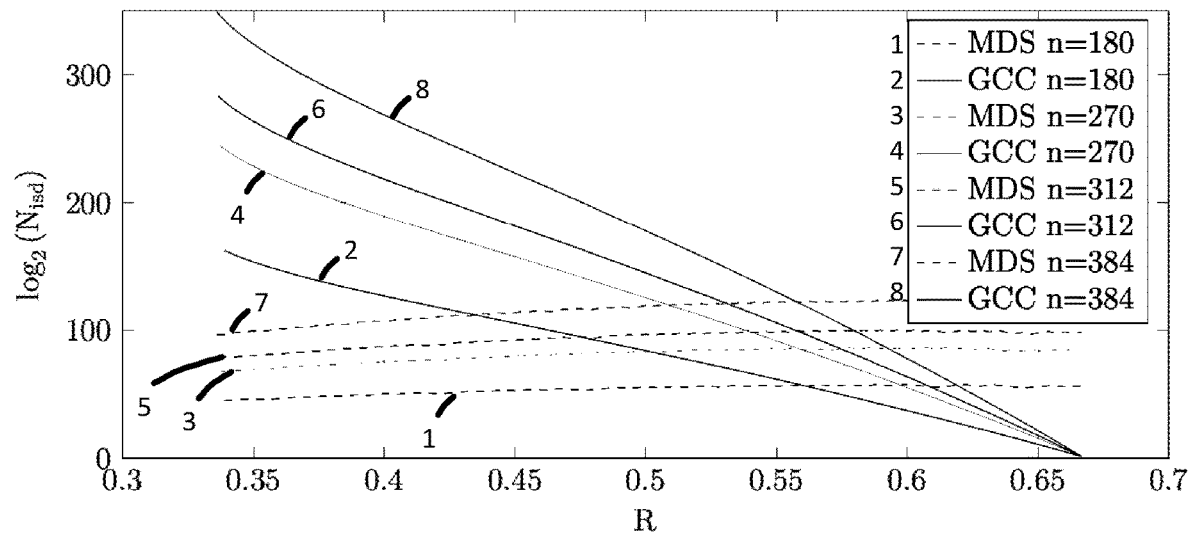
FIG. 10 an exemplary diagram showing work factors for information-set decoding over code rate.

Table 4 in FIG. 9 shows a comparison of the proposed GC codes with comparable MDS codes. The codes are compared with varying code rate R for constant code length n=312. For low code rates, a significant gain is achieved which decreases for higher code rates. This effect is also shown in FIG. 10, where the work factors for ISD of GC codes and MDS codes are plotted over the code rate R for different code length n.

Table 5 of FIG. 11 compares the proposed code construction with product codes over Gaussian integers proposed in [7], since those use the same channel model. Note that those product codes are only applicable for low code rates and have a higher work factor than MDS codes only for code rates R<1/3. Hence, rate 0.2 product codes are compared with rate 0.5 GC codes with comparable lengths. While the error correction capability is significantly higher for the product codes, due to the lower code rate, the work factor is much lower.

5.4 Decoding Beyond the Guaranteed Error Correction Capability

The guaranteed error correction capability of the proposed generalized concatenated codes is given in (14). Up to this bound, all possible error patterns can be corrected, but also some error patterns with more errors are correctable. This section discusses the error correction capability for decoding beyond the guaranteed error correction capability.

Figure 12:
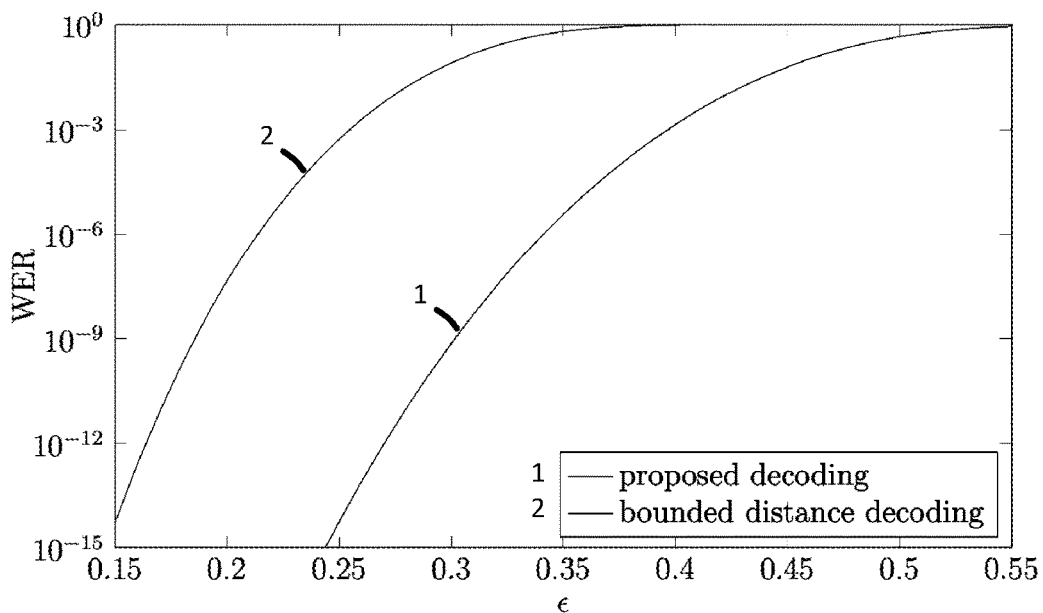
FIG. 12 an exemplary diagram showing WER over channel error probability in comparison to bounded minimum distance decoding.

FIG. 12 shows the residual word error rate (WER) versus the channel error probability e with decoding beyond the guaranteed error correction capability. The proposed decoding method is compared with bounded distance decoding up to the guaranteed error correction capability for the GC code of length n=270 and rate R=0.5. As can be seen, the proposed decoding method achieves a significant gain.

On the other hand, decoding beyond the guaranteed error correction capability leads to a residual error rate. Note that this is the case for many decoders, which were proposed for McEliece systems. While in some cases this may be undesirable, this allows for an increased number of errors and therefore an increased work factor for information-set decoding. As an example, the work factor for information-set decoding may be compared with the guaranteed error correction capability with the expected number of errors such that the residual error rate is at most 10-5. For the proposed decoding, this allows for 35% of errors, which for length n=270 corresponds to about 95 errors. According to (2), this results in a work factor of about 2133.

The work factor for the guaranteed error correction capability is only 2125, as shown in Table 5 in FIG. 11.

Note that the work factor increases if a higher residual error rate is allowed. For instance, the work factor is increased to about 2144 for a residual error rate of 10-4.

5.5 Adaptation to Eisenstein Integers

As for the product code construction over Eisenstein integers, which was adapted from the product code construction over Gaussian integers proposed in [7], the generalized concatenated code construction can also be applied to codes over Eisenstein integers. While the restrictions for the primes are different, using the same field size leads to the same code parameters and therefore the same error correction capability. Hence, for the McEliece systems, this would result in the same work factor for information-set decoding based attacks. However, for the Niederreiter system, the increased number of different error values leads to an increased message length. The adaption of the GC code construction to Eisenstein integers is straightforward given the partitioning of the inner codes. Table 6 in FIG. 13 shows some possible inner codes over Eisenstein integer fields, which were found by computed search. For primes less than 223, no codes with $d \geq 5$ were found.

For a comparison of the message length, now codes over fields of size p=229 are considered, because this field size allows for inner codes over Gaussian as well as Eisenstein integers. Using the outer RS code $C_0(80,1,80)$ of rate R=1/80 leads to GC codes of length $n=3n_0=240$ and rate R=0.34. Those codes can correct at least $t=2 \cdot (n_0-k_0)+1=159$ errors of Mannheim weight one or hexagonal weight one, respectively. The number of bits that can be mapped to the error vector for the Gaussian integer code is $$t \cdot \log_2(4) + \log_2\binom{n}{t} \approx 535. \tag{23}$$

These bits are mapped to the error positions and to the error values. For the code over Eisenstein integers, the error values can take t-log 2 (6) bits of information. Hence, the overall number of bits that can be mapped to the error vector is 628, which is about 17% higher than for Gaussian integers. To use the increased message length, the error values cannot be mapped independently, but as a vector of length t, where each component can take six different values. Hence, a base conversion is required.

5.6 Structural attacks on GC codes

The proposed ordinary concatenated codes over Gaussian and Eisenstein integers achieved work factors for ISD based attacks but are vulnerable to the structural attack from [8]. Hence, GC codes over Gaussian and Eisenstein integers are proposed above, which have even higher work factors for ISD based attacks.

In the applicability of Sendrier's attack on GC codes was investigated and alternatives for the second and third step in the original attack were proposed. But for the first step, no alternative was found. It was shown that in general this step is also applicable for GC codes.

The following provides a brief look on this first step.

Recalling the structure of the generator matrix of an OC code with outer code $A(n_A, K_A, d_A)$ and inner code $B(n_B, k_B, d_B)$, the generator matrix of the concatenated code has the form $$G_{OC} = \begin{pmatrix} a_{0,0}G_B & a_{0,1}G_B & \cdots & a_{0,n_A-1}G_B \\ a_{1,0}G_B & a_{1,1}G_B & \cdots & a_{1,n_A-1}G_B \\ \vdots & \vdots & \ddots & \vdots \\ a_{k_A-1,0}G_B & a_{k_A-1,1}G_B & \cdots & a_{k_A-1,n_A-1}G_B \end{pmatrix}. \tag{24}$$

The public key is a scrambled version of this matrix. In the first step, an attacker tries to find the columns belonging to each inner block $a_{i,j}G_B$.

Now, first some definitions and notations [8] are introduced.

Definition 1.

The support of a vector is the set of indices of all non-zero elements.

We denote the support of a vector v as supp (v).

The support of a set is the union of supports of all elements.

A codeword $c \in C$ is called minimal support codeword if $\nexists \, c' \in C \setminus \{0, c\}$ with supp $(c') \subseteq$ supp$(c)$.

The set of all minimal support codewords in C is denoted with $\mathcal{P}(C)$.

Now, first a search is made for minimum support codewords of the dual code which have their support only in one block and hence connect the support of that block. In case of GC codes, this is fulfilled for any codeword $c \in \mathcal{P}(C_{GC}^\perp)$ that fulfills $$wt_M(c) < \min(d_A^{(1)\perp}, \ldots, d_A^{(l)\perp}, 2 \cdot d_B \perp). \quad (25)$$

Let $\Xi$ denote the set of all codewords $c \in \mathcal{P}(C_{GC}^\perp)$ fulfilling (25). A sufficient condition for this step to be applicable is that the set $\Xi$ is not empty [10]. One can guarantee that $\Xi$ is empty, if the dual of any outer code $A^{(i)\perp}$ 1 has distance $d_A^{(i)\perp} \le d_B^\perp$.

By choosing a code for which the set $\Xi$ is empty, a system can be strengthened against this kind of attack, even though it does not guarantee that the step is not applicable.

In the GC code construction over Gaussian or Eisenstein integers, inner codes of length three were proposed. While those codes have a fairly high minimum Mannheim distance which allows for a high error correction capability, the minimum Hamming distance of the dual codes is $d_B^\perp=3$. Now the dual distance of the outer codes is considered. For an outer Reed-Solomon (RS) code $A^{(i)}(n_i, k_i, n_i-k_i+1)$, the dual is the RS code $A^{(i)\perp}(n_i, n_i-k_i, d_A^{(i)\perp})$, which has minimum distance $d_A^{(i)\perp}=n_i-(n_i-k_i)+1=k_i+1$. One aims for a construction which fulfills $k^{(i)}+1=d_A^{(i)\perp} \le d_B^\perp=3$ for any outer code $A^{(i)}$. Note, that in the proposed construction only two outer codes are available, one of which has to fulfill $k_i \le 2$, which limits the achievable code rates to about 1/3.

In order to guarantee that the set $\Xi$ is empty, one would require longer inner codes of high dual distance $d_B^\perp$. On the other hand, the proposed inner codes over Gaussian and Eisenstein integers have a relatively high error correction capability when restricting the error values. Hence, one aims for inner codes making use of restricted error value channels.

6. GC Codes Over Binary Extension Felds

In order to increase the security against the attack from [8], furthermore, a construction is proposed, which is similar to the GC codes over Gaussian or Eisenstein integers discussed above, but with binary inner BCH codes. To illustrate this construction, one may consider BCH codes of length $n_i$, where $n_i$ is divisible by 3.

The BCH codes have rate $R=k_i/n_i=1/3$, i.e., $k_i=2n_i/3$. Moreover, inner codes with minimum Hamming distance $d_i \ge 5$ with subcodes of dimension $k_i^{(1)}=n_i/3$ and minimum Hamming distance $d_i(1) \ge 7$ are considered. The outer RS codes are constructed over $GF(2^m)$ with $m=n_i/3$.

The channel restricts the error values to Hamming weight one per error symbol $e_i \in GF(2^m)$, i.e., one bit error in symbols of m bits. Hence, while the inner BCH codes have length $n_i$, the maximum number of errors in each BCH codeword is restricted to 3.

Example 2. Consider an inner BCH code $C_B(30,20,5)$ as shortened code of the BCH code C(31,21,5). The subcode is a BCH code $C_B^{(1)}(30,10,11)$ as shortened version of the C(31,11,11) BCH code. Consider as outer code the RS code $C_A(GF(2^{10}); 80, 1, 80)$ for the first level, whereas in the second level the information remains uncoded.

For encoding, one first take 800 information bits as 80 symbols of $GF(2^{10})$ as codeword of the uncoded second level and take another 10 information bits as one symbol of $GF(2^{10})$ and encodes them in CA. Write those codewords in the first two rows of a 3×80 codeword matrix over $GF(2^{10})$, where each symbol is a column vector of 10 bits. Hence, the matrix can also be interpreted as a 30×80 matrix over $GF(2)$. Next, encode the columns of the 3×80 matrix into 80 codewords of the inner BCH code CB.

For the channel, interpret the codeword matrix again as 3×80 matrix over $GF(2^{10})$ and add an error matrix of the same dimensions, where each symbol $e_i \in GF(2^{10})$ has Hamming weight of at most one. Hence, each inner BCH code has at most 3 errors.

The decoding procedure is similar to the one proposed for GC codes with inner codes over Gaussian or Eisenstein integers and only differs in the decoding of the inner codes. Note that with distance d=5 in the first level, the inner code can detect any error pattern with two or three errors, if the decoding only corrects one error instead of two. Hence, the inner codes can correct all error patterns with a single error in the first level, whereas the outer code can correct $n_0-k_0$ erasures for inner code words with two or three errors. Due to the distance d=7 in the second level, the inner codes can correct all possible error patterns in the second level and no outer decoding is required. This GC code can correct at least $t=2 \, (n_0-k_0)+1=157$ symbol errors.

Table 7 in FIG. 14 shows some exemplary GC codes with inner BCH codes. Shown are the parameters of the inner codes as well as the GC code, the work factor $N_{ISD}$ for ISD, the size of the public key (the generator matrix), and the dual distance $d_B^\perp$ of the inner code.

First, code 1 is compared with inner BCH code with the code 2 over Gaussian integers. The two codes have comparable key sizes but the number of correctable errors and therefore the work factor is lower for the inner BCH codes. Comparing codes 3 and 2, one can see that they use the same outer codes leading to the same GC code parameters and hence the same work factor. The key size, on the other, hand is significantly increased for the BCH codes.

Hence, using inner binary BCH codes instead of inner codes over Gaussian integers is not ideal with respect to the ISD attack. On the other hand, the GC code's inner binary BCH codes provide a better protection against the structural attack on OC codes shown earlier. This results from the fact that inner BCH codes have a higher dual Hamming distance than comparable codes over Gaussian integers.

A closer look on the security of the proposed GC codes against structural attacks reveals that in the first step of Sendrier's attack [8], an attacker needs to find codewords whose supports connect exactly one inner block, i.e., codewords of the dual code with minimum Hamming weight. The problem of finding dual codewords of a given weight is similar to the decoding problem of the ISD attack [13]. Both problems are NP-complete [2].

A straight-forward approach would be to randomly generate binary test patterns of weight $d_B^\perp$ and check whether these patterns are codewords of the dual code. For Gaussian integers, the probability $P_s^\perp$ of success for such a randomly generated pattern is the number of such codewords divided by the number of patterns of weight $d_B^\perp$, i.e., $$P_s^\perp = \frac{n_o \cdot W(d_B^\perp)}{\binom{n}{d_B^\perp} \cdot p^{d_B^\perp}}, \qquad (26)$$

Where W(i) is the weight distribution of the dual code $C^\perp$ and p is the field size. The number of matrices of weight $d_B^\perp$ is calculated as the number of possible supports times the number of possible values for the $d_B^\perp$ positions. For GC codes with inner binary codes, the probability $P_s^\perp$ of success is $$P_s^\perp = \frac{n_o \cdot W(d_B^\perp)}{\binom{nm}{d_B^\perp}}. \qquad (27)$$

The work factor for finding such a codeword is the average number of attempts $N_{SA}=1/P_s^\perp$.

For the proposed codes over binary extension fields from Table 7 in FIG. 14., $N_{SA}$ is about $2^{87}$ and $2^{88}$, respectively. Note, that the work factor mainly depends on the minimum Hamming distance $d_B^\perp$ of the dual code and the field size, where $d_B^\perp$ is much smaller for the codes over Gaussian or Eisenstein integers. Assuming the same number of minimum weight codewords in the dual code, i.e., the same value $W(d_B^\perp)$, the code over $\mathcal{G}_{157}$ from Table 7 has a work factor of about $N_{SA}=2^{31}$ for finding such a codeword. Hence, binary BCH codes as inner codes lead to lower work factors for ISD but higher work factors for finding minimum weight dual codewords.

Table 8 in FIG. 15 shows a comparison of the proposed GC codes with MDS codes of same length and dimension. While the key size for the proposed codes is increased by about 11% to 23% the exponent of the work factor for information set decoding is increased by a about 250%. Hence, the proposed codes show a significant improvement compared to MDS codes.

Herein, a code construction is proposed which is based on generalized concatenated codes over Gaussian and Eisenstein integers for the use in code-based cryptosystems. These GC codes can be decoded with a simple decoding method that requires only table look-ups for the inner codes and erasure decoding of the outer Reed-Solomon codes. The proposed construction is a generalization of the ordinary concatenated (OC) codes proposed in [7]. While the number of correctable errors is lower than with the concatenated codes, the work factor for information-set decoding (ISD) is increased with GC codes. For rates R≤5/9, the generalized concatenated codes can correct more errors than MDS codes. They allow for high work factor for ISD even for relatively short codes.

Furthermore, to improve the robustness against structural attacks [8], GC codes over binary extension fields using inner BCH codes are proposed herein. This construction leads to a decreased work factor compared to GC codes with inner codes over Gaussian or Eisenstein integers. However, the dual distance of the inner code is higher than for the inner codes over Gaussian or Eisenstein integers. Moreover, the binary extension fields enable efficient hardware implementations.

While above at least one exemplary embodiment of the present solution has been described, it has to be noted that a great number of variations thereto exists. Furthermore, it is appreciated that the described exemplary embodiments only illustrate non-limiting examples of how the present solution can be implemented and that it is not intended to limit the scope, the application or the configuration of the herein-described apparatus, systems, and methods. Rather, the preceding description will provide the person skilled in the art with constructions for implementing at least one exemplary embodiment of the present solution, wherein it must be understood that various changes of functionality and the arrangement of the elements of the exemplary embodiment can be made, without deviating from the subject-matter defined by the appended claims.

LIST OF REFERENCES

[1] G. Alagic, J. Alperin-Sheriff, D. Apon, D. Cooper, Q. Dang, J.Kelsey, Y.-K. Liu, C. Miller, D. Moody, R. Peralta, R. Perlner, A. Robinson, and D. Smith-Tone, "Status report on the second round of the NIST post-quantum cryptography standardization process," National Institute of Standards and Technology, NISTIR 8309, 2020.

[2] E. Berlekamp, R. McEliece, and H. van Tilborg, "On the inherent intractability of certain coding problems", IEEE Transactions on Information Theory, vol. 24, no. 3, pp. 384-386, 1978.

[3] R. McEliece, "A public-key cryptosystem based on algebraic coding theory", DSN Progress Report, vol. 42-44, pp. 114-116, 1978.

[4] H. Niederreiter, "Knapsack-type cryptosystems and algebraic coding theory", Probl. Control Inf. Theory, vol. 15, pp. 159-166, 1986.

[5] E. Prange, "The use of information sets in decoding cyclic codes", IRE Transactions on Information Theory, vol. 8, no. 5, pp. 5-9, September 1962.

[6] A. May, A. Meurer, and E. Thomae, "Decoding random linear codes inO (20.054n)" in Advances in Cryptology-ASIACRYPT 2011, D. H. Lee and X. Wang, Eds. Berlin, Heidelberg: Springer Berlin Heidelberg, 2011, pp. 107-124.

[7] J. Freudenberger and J.-P. Thiers, "A new class of q-ary codes for the McEliece cryptosystem", Cryptography, vol. 11, no. 5, 2021.

[8] N. Sendrier, "On the structure of randomly permuted concatenated code", Ph.D. dissertation, INRIA, 1995.

[9] V. M. Sidelnikov and S. O. Shestakov, "On insecurity of cryptosystems based on generalized Reed-Solomon codes", Discrete Mathematics and Applications, vol. 2, no. 4, pp. 439-444, 1992.

[10] S. Puchinger, S. M"uelich, K. Ishak, and M. Bossert, "Code-based cryptosystems using generalized concatenated codes" in Applications of Computer Algebra, I. S. Kotsireas and E. Mart'nez-Moro, Eds. Cham: Springer International Publishing, 2017, pp. 397-423.

[11] K. Huber, "Codes over Gaussian integers", IEEE Transactions on Information Theory, pp. 207-216, 1994.

[12] K. Huber, "Codes over Eisenstein-Jacobi integers", Contemporary Mathematics, pp. 65-179, January 1994.

[13] J. Stern, "A method for finding codewords of small weight" in Coding Theory and Applications, G. Cohen and J. Wolfmann, Eds. Berlin, Heidelberg: Springer Berlin Heidelberg, 1989, pp. 106-113.

What is claimed is:

1. An encoding method for error correction encoding of information to be carried by a channel to be stored in a memory device, the encoding method comprising:
   providing a coding system; and
   using the coding system to subject the information to error correction encoding to obtain encoded information to be stored in the memory device;
   wherein the error correction encoding comprises:
      encoding the information according to a McEliece cryptosystem or according to a Niederreiter cryptosystem, in each case using an error vector containing at most t E N non-zero error values; and
      a combination of:
         a permutation operation,
         a scrambling operation; and
         a coding operation to improve error correction capabilities that includes a generalized concatenated code (GCC) having an error correction capability t up to which it can correct all possible error patterns and the GCC comprising:
            multiple outer codes $A^{(1)}$ with different dimensions $n_1$ and $l=0, \ldots, N$, with $N \in \mathbb{N}$ and $n_1 \in \mathbb{N}$; and
            an inner code B, the inner code B being one of an error correction code over a Gaussian integer field, $\mathbb{F}_{p,G}$, an error correction code over an Eisenstein integer field, $\mathbb{F}_{p,E}$ or a q-ary BCH error correction code over an integer field, $\mathbb{F}_q$, where p is a prime number with p>2 in the case of the error correction codes over Gaussian integers or Eisenstein integers, and with $q=p^m$, with m>0 being an integer, in the case of the q-ary BCH error correction code; and
         wherein the alphabet used for generating the error vector in the McEliece cryptosystem or the Niederreiter cryptosystem, respectively, is selected such that each element of the alphabet is selected from a predetermined true subset of the finite fields $\mathbb{F}_{p,G}$, $\mathbb{F}_{p,E}$ or $\mathbb{F}_q$ over which the GCC is defined.

2. The method of claim 1, wherein the alphabet used for generating the errors using the McEliece cryptosystem the alphabet used for generating the errors is selected such that each element of the alphabet has:
   in the case of the Gaussian integers, a Mannheim weight of 1;
   in the case of the Eisenstein integers, a hexagonal weight of 1; and
   in the case of inner BCH codes, a Lee-weight of 1 per m symbols.

3. The method of claim 1, wherein the inner code B is:
   one of an error correction code over Gaussian integers or an error correction code over Eisenstein integers, and chosen to be a one-error-correcting code.

4. The method of claim 1, wherein the code C (n, k, t) is chosen such that is has a code rate R=k/n with R≤5/9.

5. The method of claim 1, wherein at least one of the outer codes of the GCC is chosen to be a Reed-Solomon, RS, code.

6. An encoding method, the method comprising:
   providing a coding system; and
   using the coding system to subject the information to error correction encoding to obtain encoded information to be stored in a memory device, wherein the encoded information encoded with a GCC;
   wherein the error correction encoding comprises:
      encoding the information according to a McEliece cryptosystem or according to a Niederreiter cryptosystem, in each case using an error vector containing at most t E N non-zero error values; and
      a combination of:
         a permutation operation,
         a scrambling operation; and
         a coding operation to improve error correction capabilities that includes a generalized concatenated code (GCC) having an error correction capability t up to which it can correct all possible error patterns and the GCC comprising:
            multiple outer codes $A^{(1)}$ with different dimensions $n_1$ and $l=0, \ldots, N$, with $N \in \mathbb{N}$ and $n_1 \in \mathbb{N}$; and
            an inner code B, the inner code B being one of an error correction code over a Gaussian integer field, $\mathbb{F}_{p,G}$, an error correction code over an Eisenstein integer field, $\mathbb{F}_{p,E}$ or a q-ary BCH error correction code over an integer field, $\mathbb{F}_q$, where p is a prime number with p>2 in the case of the error correction codes over Gaussian integers or Eisenstein integers, and with $q=p^m$, with m>0 being an integer, in the case of the q-ary BCH error correction code; and
         wherein the alphabet used for generating the error vector in the McEliece cryptosystem or the Niederreiter cryptosystem, respectively, is selected such that each element of the alphabet is selected from a predetermined true subset of the finite fields $\mathbb{F}_{p,G}$, $\mathbb{F}_{p,E}$ or $\mathbb{F}_q$ over which the GCC is defined; and
   wherein erasure decoding is applied for the outer codes of the GCC such that all decoding errors, if any, are recognized during the decoding of the GCC.

7. The method of claim 6, the method further comprising:
a) Partitioning the inner code B of the GCC into m+1 multiple sub-codes $B^{(i)}$ with $i=0, \ldots, m$, with m being a predetermined integer and with $B^{(0)}=B$:
b) Decoding the first-level inner code $B^{(0)}$ to retrieve codewords $b_j$, with $j=0, \ldots, n_0$, of the inner code B or erasures;
c) Determining the code symbols $a_j^{(0)}$ of the first-level outer code $A^{(0)}$ among the multiple outer codes of the GCC for all known codewords $b_j$ by re-encoding the inner codewords $b_j^{(1)}$ and $b_j^{(0)}$;
d) Decoding the first-level outer code $A^{(0)}$ to determine the positions of erased symbols among the code symbols $a_j^{(0)}$, if any;
e) Encoding the symbols $a_j^{(0)}$ to the codewords $b_j^{(0)}$ for the positions of the determined erased symbols, if any;
f) Determining the inner codewords $b_j^{(1)}=b_j-b_j^{(0)} \in B^{(1)}$, where B(1) is a first-level sub-code $B_{(1)}$ of the inner code B;
   Decoding the inner sub-codes $B^{(1)}$ for all determined positions of erased symbols.

8. The method of claim 7, the method further comprising:
attempting a decoding of the encoded information, even when a determined number of errors in a determined error pattern exceeds an error correction capability t of the GCC up to which the GCC can correct all possible error patterns.

9. The method of claim 7, wherein process (b) includes:
detecting all error patterns occurring in the first-level inner code B(0), if any;

using a look-up table with precomputed syndromes for decoding all error patterns among the detected error patterns, which only have a single error; and for all error patterns among the detected error patterns, which have multiple errors, declaring an erasure and storing the identified locations of the errors as positions of erased symbols.

10. The method of claim 9, the method further comprising:

attempting a decoding of the encoded information, even when a determined number of errors in a determined error pattern exceeds an error correction capability t of the GCC up to which the GCC can correct all possible error patterns.

11. The method of claim 6, the method further comprising:

attempting a decoding of the encoded information, even when a determined number of errors in a determined error pattern exceeds an error correction capability t of the GCC up to which the GCC can correct all possible error patterns.

12. A non-transitory computer readable medium embodying instructions which when executed by one or more encoding processors cause the one or more encoding processors to:

encode an information according to a McEliece cryptosystem or according to a Niederreiter cryptosystem, in each case using an error vector containing at most $t \in \mathbb{N}$ non-zero error values; and a combination of:
   a permutation operation,
   a scrambling operation; and
   a coding operation to improve error correction capabilities that includes a generalized concatenated code (GCC) having an error correction capability t up to which it can correct all possible error patterns and the GCC comprising:
      multiple outer codes $A^{(1)}$ with different dimensions $n_1$ and $1=0, \ldots, N$, with $N \in \mathbb{N}$ and $n_1 \in \mathbb{N}$; and
      an inner code B, the inner code B being one of an error correction code over a Gaussian integer field, $\mathbb{F}_{p,G}$, an error correction code over an Eisenstein integer field, $\mathbb{F}_{p,E}$ integers, or a q-ary BCH error correction code over an integer field, $\mathbb{F}_q$, where p is a prime number with p>2 in the case of the error correction codes over Gaussian integers or Eisenstein integers, and with $q=p^m$, with m>0 being an integer, in the case of the q-ary BCH error correction code; and
   wherein the alphabet used for generating the error vector in the McEliece cryptosystem or the Niederreiter cryptosystem, respectively, is selected such that each element of the alphabet is selected from a predetermined true subset of the finite fields $\mathbb{F}_{p,G}$, $\mathbb{F}_{p,E}$ or $\mathbb{F}_q$ over which the GCC is defined.

13. The non-transitory computer readable medium of claim 12, wherein the alphabet used for generating the errors using the McEliece cryptosystem the alphabet used for generating the errors is selected such that each element of the alphabet has:

in the case of the Gaussian integers, a Mannheim weight of 1;

in the case of the Eisenstein integers, a hexagonal weight of 1; and in the case of inner BCH codes, a Lee-weight of 1 per m symbols.

14. The non-transitory computer readable medium of claim 12, wherein the inner code B is:

one of an error correction code over Gaussian integers or an error correction code over Eisenstein integers, and chosen to be a one-error-correcting code.

15. The non-transitory computer readable medium of claim 12, wherein the code C(n, k, t) is chosen such that is has a code rate R=k/n with R≤5/9.

16. The non-transitory computer readable medium of claim 12, wherein at least one of the outer codes of the GCC is chosen to be a Reed-Solomon, RS, code.

17. An encoding system, the encoding system comprising:
memory storing a computer program; and
a processing circuit coupled to the memory, wherein the processing circuit is configured to execute the computer program to:

encode an information according to a McEliece cryptosystem or according to a Niederreiter cryptosystem, in each case using an error vector containing at most $t \in \mathbb{N}$ non-zero error values; and a combination of:
   a permutation operation,
   a scrambling operation; and
   a coding operation to improve error correction capabilities that includes a generalized concatenated code (GCC) having an error correction capability t up to which it can correct all possible error patterns and the GCC comprising:
      multiple outer codes $A^{(1)}$ with different dimensions $n_1$ and $I=0, \ldots, N$, with $N \in \mathbb{N}$ and $n_1 \in \mathbb{N}$; and
      an inner code B, the inner code B being one of an error correction code over a Gaussian integer field, $\mathbb{F}_{p,G}$, an error correction code over an Eisenstein integer field, $\mathbb{F}_{p,E}$, or a q-ary BCH error correction code over an integer field, $\mathbb{F}_q$, where p is a prime number with p>2 in the case of the error correction codes over Gaussian integers or Eisenstein integers, and with $q=p^m$, with m>0 being an integer, in the case of the q-ary BCH error correction code; and
   wherein the alphabet used for generating the error vector in the McEliece cryptosystem or the Niederreiter cryptosystem, respectively, is selected such that each element of the alphabet is selected from a predetermined true subset of the finite fields $\mathbb{F}_{p,G}$, $\mathbb{F}_{p,E}$, or $\mathbb{F}_q$ over which the GCC is defined.

18. The system of claim 17, wherein the alphabet used for generating the errors using the McEliece cryptosystem is selected such that each element of the alphabet has:

in the case of the Gaussian integers, a Mannheim weight of 1;

in the case of the Eisenstein integers, a hexagonal weight of 1; and in the case of inner BCH codes, a Lee-weight of 1 per m symbols, wherein $n_1$ is a code length, p is a prime number, and q is a natural number.

19. The system of claim 17, wherein the inner code B is:
one of an error correction code over Gaussian integers or an error correction code over Eisenstein integers, and chosen to be a one-error-correcting code.

20. The system of claim 17, wherein the code C(n, k, t) of length n, dimension k, and the error correction capability t is chosen such that is has a code rate R=k/n with R≤5/9.

21. The system of claim 17, further comprising:
a memory device coupled to the processing circuitry, the memory device to receive and store encoded information, wherein at least one of the outer codes of the GCC is chosen to be a Reed-Solomon, RS, code.

* * * * *